United States Patent [19]

Bert et al.

[11] 3,965,773

[45] June 29, 1976

[54] POWER TRANSMISSION UNIT

[76] Inventors: George J. Bert, 26825 Elmwood Ave., Westlake, Ohio 44145; Edward J. Stehle, 7188 Thorncliffe Blvd., Parma, Ohio 44134; Herbert D. Groth, 1187 Gladys Ave., Lakewood, Ohio 44107

[22] Filed: Aug. 26, 1974

[21] Appl. No.: 500,639

[52] U.S. Cl.................................. 74/804; 74/805
[51] Int. Cl.².............................................. F16H 1/28
[58] Field of Search........................ 74/804, 805, 394

[56] References Cited
UNITED STATES PATENTS 1,920,877  8/1933  'Odatto.................................. 74/394
3,144,791  8/1964  Menge, Sr............................. 74/804

*Primary Examiner*—Samuel Scott
*Assistant Examiner*—A. Russell Burke
*Attorney, Agent, or Firm*—Baldwin, Egan, Walling & Fetzer

[57] ABSTRACT

A power transmission unit which can be used as a speed increaser or a speed reducer. A cylindrical element is fixed on a shaft and a second cylindrical element surrounding the first element is adapted to roll eccentrically therearound and to rotatably drive an element connectable thereto. The cylindrical element may be provided with smooth contacting surfaces or alternatively gear teeth or the like to provide in either instance a slip-free engagement therebetween.

4 Claims, 5 Drawing Figures

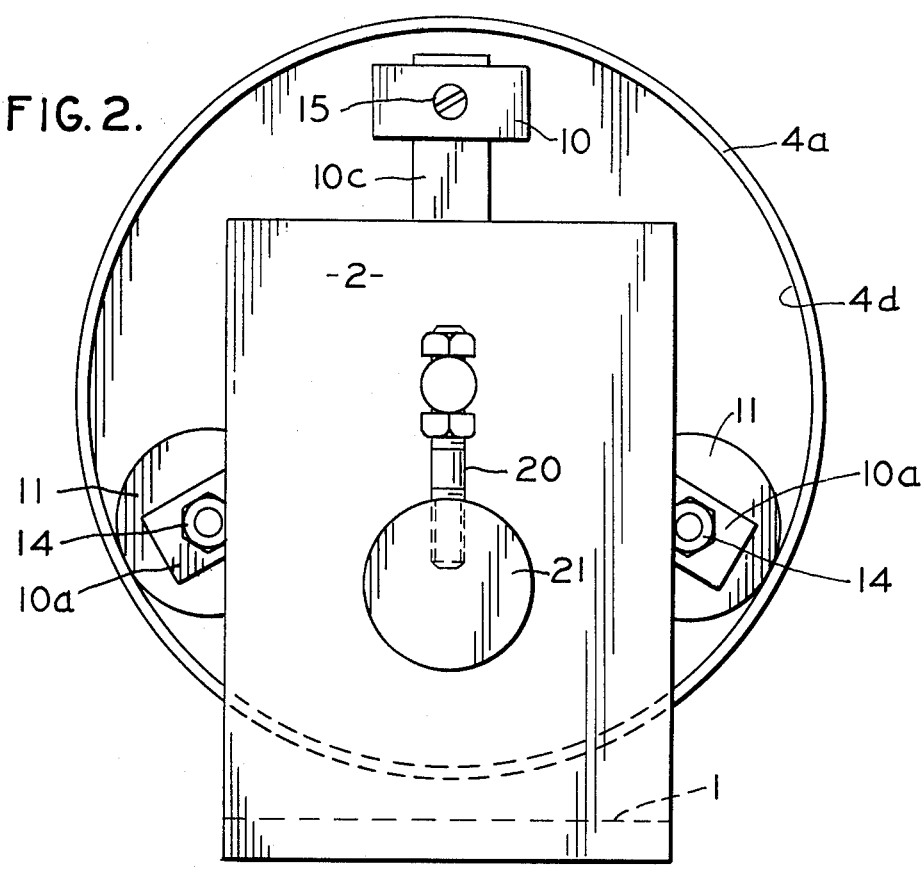
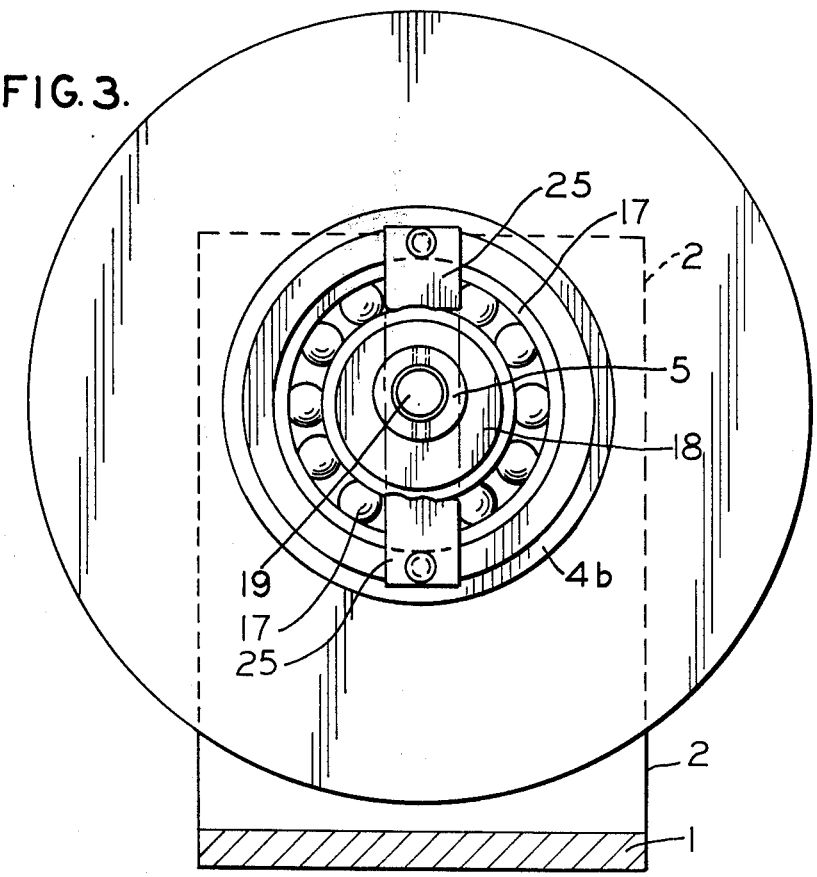

POWER TRANSMISSION UNIT

BACKGROUND

This invention is an improvement of the subject matter of the type of device disclosed in United States patent 1,920,877 which illustrates a power transmission unit having rolling members or elements rollably moving over the outer rim of a ring gear wherein as the rotational velocity of the unit is increased, the degree of power transfer decreases. The present device is a decided improvement over said earlier referenced device by having the degree of power transfer increase as the velocity of the device increases.

Other advantages of the present device will likewise be apparent to one skilled in the art.

SUMMARY

The invention relates to a power transmission unit. It also can be used as a speed reducer, speed increaser or direct drive. More particularly, it can be used as an independent unit or incorporated into a mechanical power transmission line. This invention comprises an element for incorporation in a machine unit or mechanical power transmission line embodying a cylindrical element fixed on a shaft and which is engaged by a cylindrical element placed around the fixed element and adapted to move eccentrically thereabout and which drives a sleeve through a suitable transfer medium such as an arm carrier carrying rollers adapted to ride on an internal circumference of a flange formed in the surrounding cylindrical element. The cylindrical elements may be internal and external gears, the ratio of the teeth of which may be selected to suit the particular power transmission application. The power may be applied to either end of the unit.

With this power transmission unit the amount of friction involved in the transfer of power is reduced to a minimum and mechanical advantage is maintained at a maximum.

Likewise, this unit provides a power transfer unit which provides speed changing or torque increasing features as may be determined, such mechanism also being relatively noiseless in operation and able to withstand severe usage.

The cylindrical elements or alternatively the external and internal gear elements provide a freely running mechanism wherein power ratios and adjustments may be provided for with greater freedom than is customary with other types of mechanism for the same purpose, and without involving any loss of mechanical advantage through such additional features of adjustment.

DESCRIPTION OF THE DRAWINGS

FIG. 2 is an end view;

FIG. 3 is a view taken along the line 3-3 in FIG. 1 shown partly in section;

DESCRIPTION OF THE DISCLOSED EMBODIMENT

Figure 1:
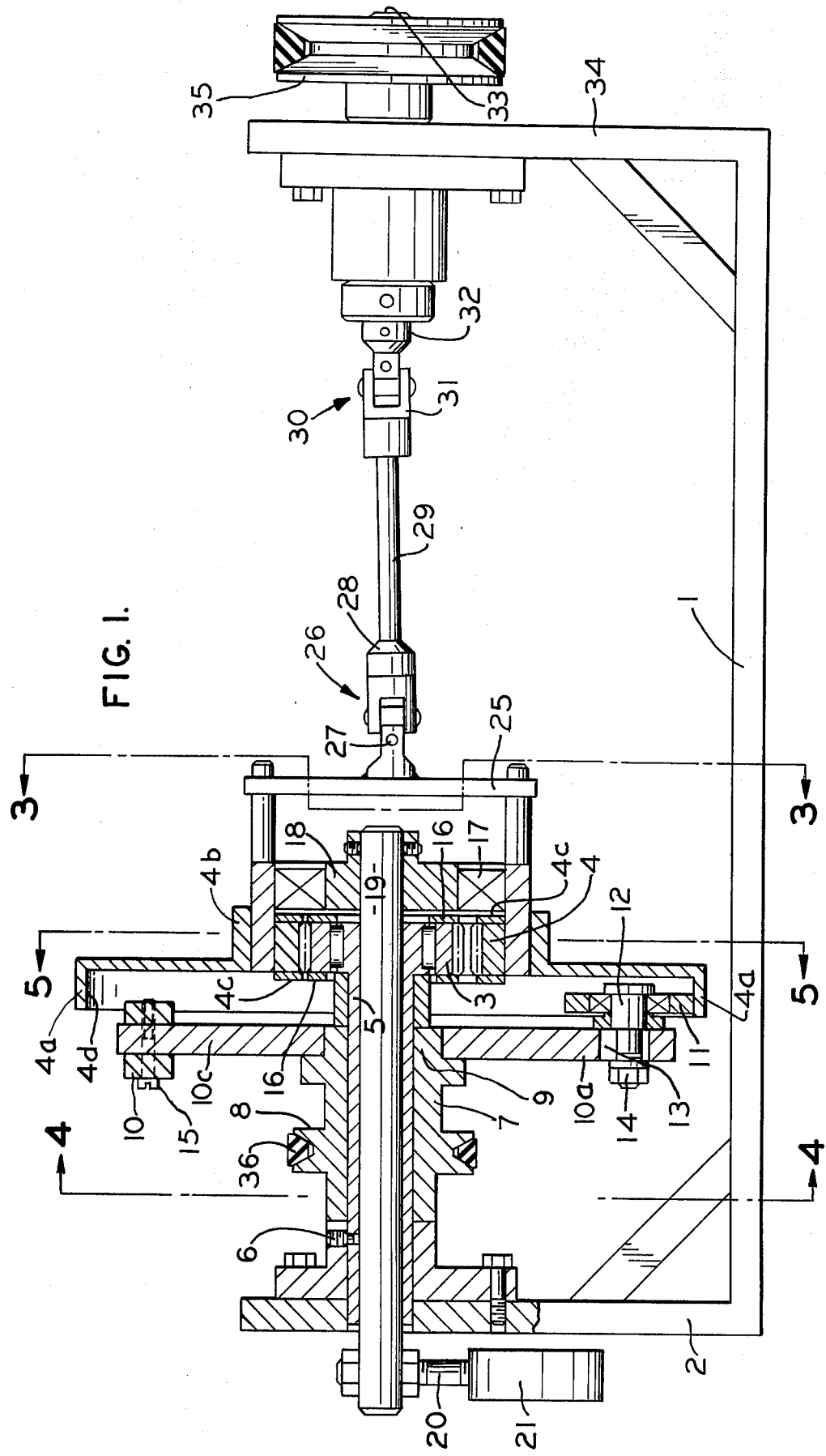
FIG. 1 is a longitudinal section of the power transmission unit embodying the present invention.
Figure 4:
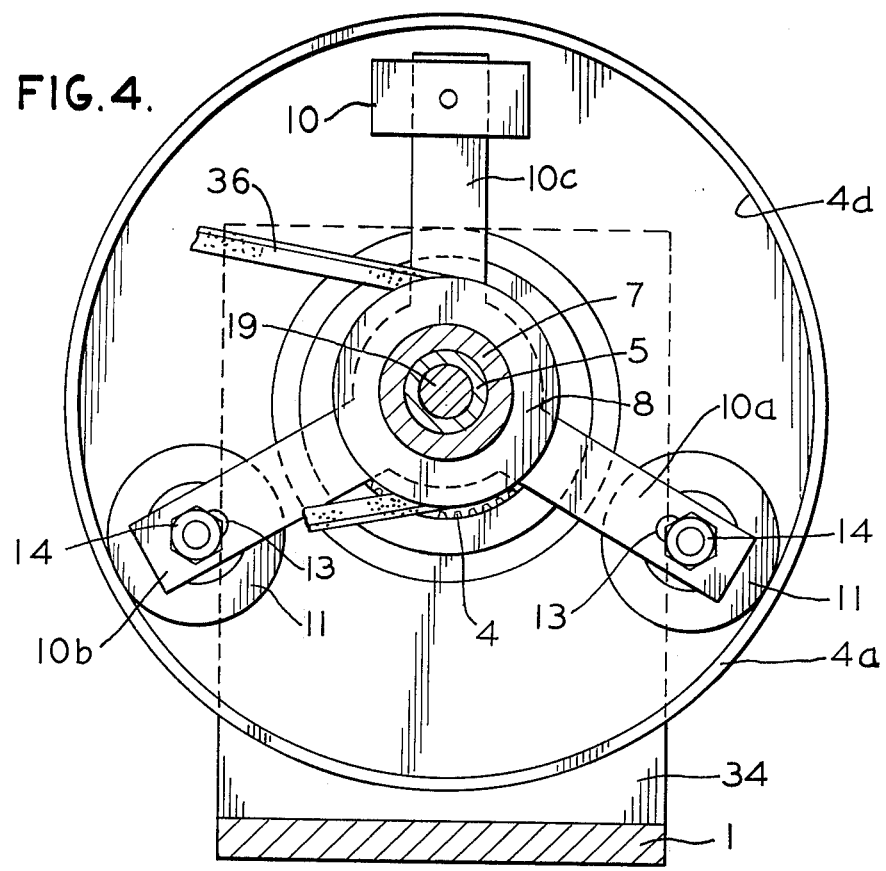
FIG. 4 is a view taken along the line 4-4 in FIG. 1.
Figure 5:
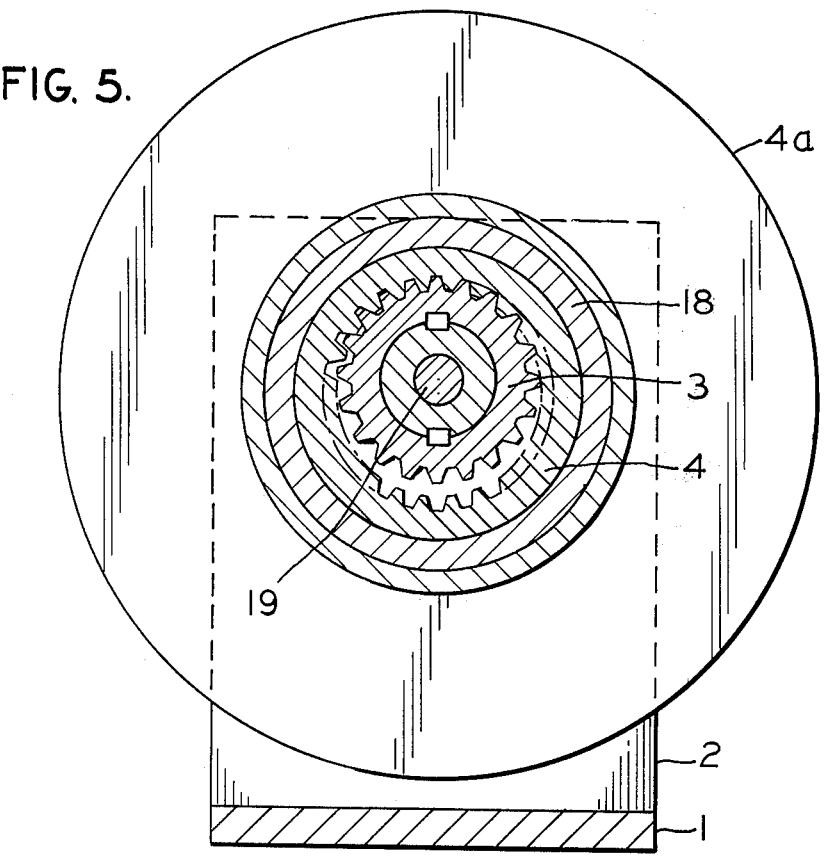
FIG. 5 is a view taken along the line 5-5 in FIG. 1.

As will be seen from the drawings the apparatus comprises a base member 1, FIG. 1 and two standards 2 and 34. The standard 2 carries in a fixed relation at one end thereof a circular external gear 3 upon which is engaged an internal gear 4 which is a part of an internal gear unit. The internal gear unit has the following concentric parts, FIGS. 1 and 5: internal gear 4, flange 4a, hub 4b, and two rolling rings 4c. The fixed gear 3 is supported on a bearing sleeve 5 held against rotation in standard 2 by means of a set screw 6 at the top thereof. Upon said sleeve is rotatably supported a second sleeve 7 carrying a pulley 8 at one end and an arm carrier 9 firmly secured to its opposite end. Pulley 8 is intended to be connectable by a suitable belt 8a or the like for transmitting power therebetween, either input or output with respect to said pulley. Said arm carrier can have a number of roller carrying or balancing arms FIGS. 1 and 4 located in preselected radial spaced relation in the plane of rotation of sleeve 7.

In actual practice, as will be hereinafter apparent from the disclosure of this invention, it may be desirable to provide more than two drive roller carrying arms spaced apart about the rotational center of the unit in order to provide the desirable degree of power transfer or capacity.

In the present configuration said carrier has three arms 9, 10a and 10b located at 120° in the plane of rotation. The arms 10 and 10b extend in radial directions to support the rollers or drive wheels 11 at the outer end thereof. Each of said rollers is rotatably supported on a stud 12 adjustable engaged with the end of said arms and the flange 4a of the internal gear unit by means of a slot 13 and a clamping nut 14. One of said arms carries a counterweight 10 adapted to be held in position in any desired radial adjustment by means of a set screw 15 to provide dynamic balance for the arm carriers 9, 10a, 10b and rollers or driving wheels 11. Said rollers or driving wheels can be brought into line contact with said flange, preloaded over their arc of engagement with the flange and locked in place with clamping nuts 14 to provide a non-slip rolling contact between said members.

Likewise, with respect to dynamic balancing of the arms 9, 10a and 10b, one or more of the arms may be utilized to carry any combination of counterweight(s) sufficient to provide dynamic balance of the particular arrangement of arm members utilized.

The geometrical configuration of the roller carrying arms in the arm carrier 9 and the internal gear unit are such that the centrifugal loading will push the rollers into close contact with the inner surface 4d of flange 4 during their respective arcs of engagement. This is a distinct advantage over the older version of this apparatus (U.S. Pat. No. 1,920,877) for additionally ensuring a non-slip rolling contact in the system and increasing the operational speed range.

In order to suitably center and support the internal gear unit 4 upon the fixed gear 3 for high power capacities, the internal gear unit rolls on its own cylindrical rolling rings 4c FIG. 1 in contact with the track rings 16 with the rings mounted concentrically with their respective internal and fixed gear centers, and on the rolling element bearing 17 mounted on the internal gear unit hub 4b and the eccentric member 18. Said eccentric member is supported upon a shaft 19 extended through the sleeve 5 of the fixed gear and projecting beyond the opposite side of the bearing in standard 2. The projecting end of the shaft 19 carries an arm 20 which mounts a counterweight 21 FIGS. 1 and 2 adapted to be fixedly positioned at any point along said arm 20 suitable to counterbalance the internal gear unit if required. The cylindrical track rings 16 are secured on both sides of the fixed gear 3 and slightly below the top edge of the teeth by means of any suitable fastening elements. Said track rings are engaged by the rolling rings 4c secured to both sides of the internal gear unit by any suitable fastening elements.

In order to transmit power to and from the eccentrically moving internal gear unit a strap 25 FIG. 1 is securely connected across the diameter of hub 4b of the internal gear unit. A universal joint 26 is connected to the strap 25 by means of a suitable connection 27. The universal joint is connected by another suitable connection 28 to a shaft 29 having a similar universal joint 30 and suitable connections 31, 32 arrangement at its opposite end. Proper angular positioning of these universal joints performs an additional function in filtering out the wobble of the internal gear unit in relationship to power transfer shaft 33, thus ensuring a smooth uniform velocity ratio between the internal gear unit and shaft 33. Said shaft is supported in standard 34 and has a pulley 35 at its opposite end as the point of power takeoff or input.

With an apparatus of the character described should power be applied through pulley 35, last referred to, it will be transmitted with an increase in speed at the output side (element 8). The power will first pass through shafts 33 and 29 and universal joints 30, 26 to the eccentrically moving internal gear unit. The internal gear unit with the internal gear 4 being in mesh with the fixed gear 3 will rotate around said fixed gear and will be brought into driving relation through its circumference with the rollers 11 supported by the arms of the arm carrier 9. Said rollers will be forced around the circumference of the flange 4a of the internal gear unit as said unit rotates eccentrically around the fixed gear member with the ratio of its revolutions determined by the number of teeth in the internal and external gears. As the arms rotate with the rollers the arm carrier 9 will carry with it the sleeve 5 and its associated pulley 8 and the power may be taken from the pulley in the usual manner by means of a drive belt 36.

While the embodiment of drive unit herein disclosed incorporates gearing elements 3 and 4, it is understood as aforesaid that said elements may be simply cylindrical elements having smooth coacting engaging surfaces in power transfer relation, it being likewise understood that said cylindrical elements will be sufficiently preloaded to provide slip-free drive relation therebetween.

Also, in the use of smooth cylinders the ratio of rotation between the power transfer elements is the same as in the disclosed embodiment, i.e., a function of the degree of eccentricity of the eccentric member (corresponding to element 18) to the fixed cylindrical member (corresponding to gear 3).

Should it be desired to operate the device to reduce the speed, the power may be applied through the last mentioned pulley 8 and thence through the arm carrier 9 and rollers 11 to the internal gear unit which then will be forced to move as before eccentrically around the fixed gear 3. The power then will be transmitted through the universal joints to shaft 33, the power being taken from the pulley 35 by means of a suitable belt 37. The pulley-drive belt arrangements on shafts 5 and 33 could be easily replaced by geared arrangements.

Through the use of suitable gear ratios substantially any desired ratio of the input and output of the transmission may be provided for.

Also, power fed into the system through pulley 8 could be taken off from shaft 19 or any other shaft arrangement which could be connected by suitable means to the eccentric member 18.

The action of pure rolling between the rollers and the flange of the internal gear unit, and rolling and track rings, and rolling element bearing provides continuous positive engagement of gear teeth and consequently, this apparatus insures quietness of operation as well as freedom of vibration and a high degree of mechanical efficiency.

What is claimed is:

1. A power transmission unit having in combination a base, a fixed external gear mounted on said base, arm carrier means rotatably mounted on said base, at least one roller mounted on said arm carrier means, an internal gear encircling said fixed external gear engaging said fixed gear having an internal circumferential flange surface facing the rotational center of the arm carrier, said roller rollably engaging said internal flange surface effective to provide a slip-free relation therebetween, and means for supporting said internal gear for eccentric movement about said fixed gear.

2. A power transmission unit as defined in claim 1, and wherein the external fixed gear is carried on a bearing member mounted on said base, a shaft extending through said bearing member, an eccentric member mounted on one end of said shaft, and connectable to said internal gear, said eccentric member being formed with said internal circumferential flange surface, and means for driving said internal gear.

3. A power transmission unit as defined in claim 1 and wherein said arm carrier means includes a plurality of arms each rotatably mounting a roller, and each of said rollers rollably engaging said internal flange surface.

4. A power transmission unit as defined in claim 3 and wherein the rollers rollably engage said internal flange surface in a slip-free relation and with a pressure that is responsive to the rate of rotation of said arm carrier means.

* * * * *